United States Patent

Kang

(10) Patent No.: US 10,173,649 B2
(45) Date of Patent: Jan. 8, 2019

(54) BRAKE MASTER CYLINDER

(71) Applicant: MANDO CORPORATION, Pyeongtaek-si, Gyeonggi-do (KR)

(72) Inventor: Dong-Koo Kang, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 262 days.

(21) Appl. No.: 15/146,677

(22) Filed: May 4, 2016

(65) Prior Publication Data

US 2016/0325723 A1  Nov. 10, 2016

(30) Foreign Application Priority Data

May 6, 2015  (KR) .................. 10-2015-0062992

(51) Int. Cl.
- *B60T 7/04* (2006.01)
- *B60T 7/08* (2006.01)
- *B60T 11/16* (2006.01)

(52) U.S. Cl.
CPC .............. *B60T 7/042* (2013.01); *B60T 7/085* (2013.01); *B60T 11/16* (2013.01)

(58) Field of Classification Search
CPC ........... B60T 7/042; B60T 7/085; B60T 11/16
USPC .......................................................... 60/562
See application file for complete search history.

(56) References Cited

U.S. PATENT DOCUMENTS

2013/0205881 A1* 8/2013 Naether ................. B60T 7/042
73/121

FOREIGN PATENT DOCUMENTS

KR  10-1085801 B1  11/2011

OTHER PUBLICATIONS

Chinese Office Action dated Apr. 23, 2018 issued in Chinese Patent Application No. 201610293580.7.

* cited by examiner

*Primary Examiner* — Thomas E Lazo
*Assistant Examiner* — Daniel S Collins
(74) *Attorney, Agent, or Firm* — McDermott Will & Emery LLP

(57) ABSTRACT

A brake master cylinder is disclosed. A brake master cylinder comprises a cylinder body having a hollow, a piston provided to reciprocate in the hollow, and a sensor module connected on the cylinder body and configured to sense a movement according to a reciprocating motion of the piston. And the sensor module includes a sensor housing coupled to a guide hole formed parallel with the hollow of the cylinder body and having a hollow therein in a length direction, a magnet installed to be slidable through the hollow of the sensor housing, and an actuating member coupled to the piston and configured to move the magnet according to a movement of the piston.

11 Claims, 4 Drawing Sheets

[Fig. 1]
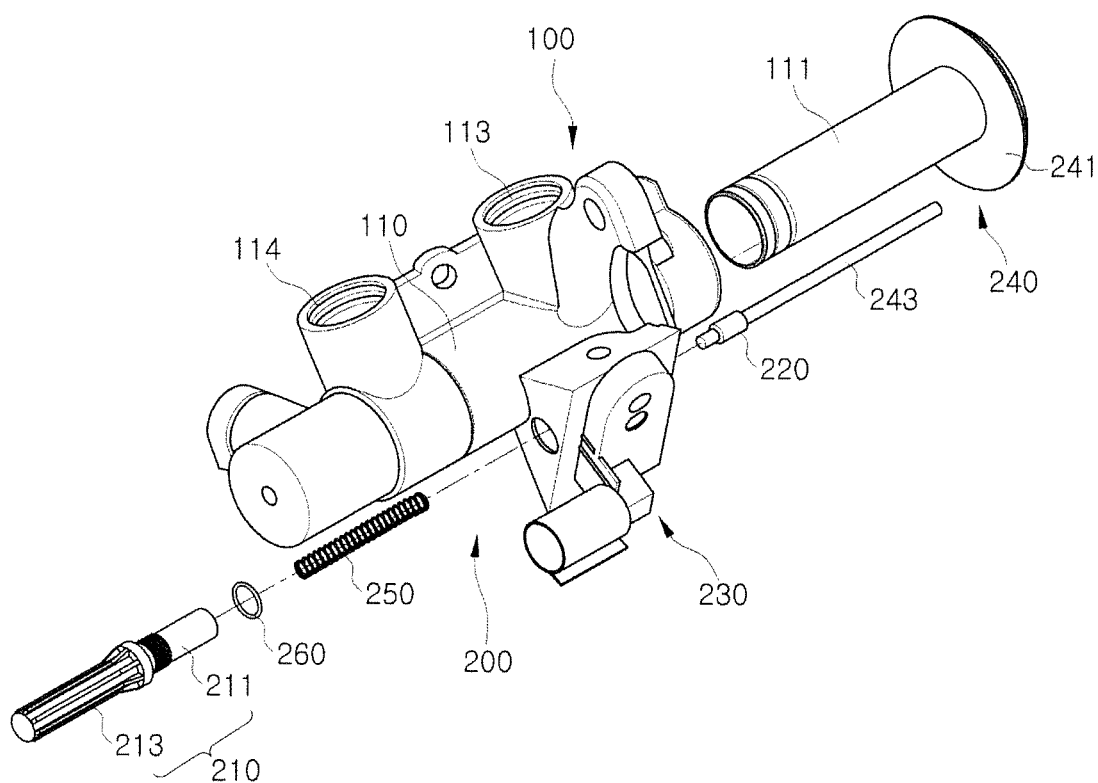

[Fig. 2]
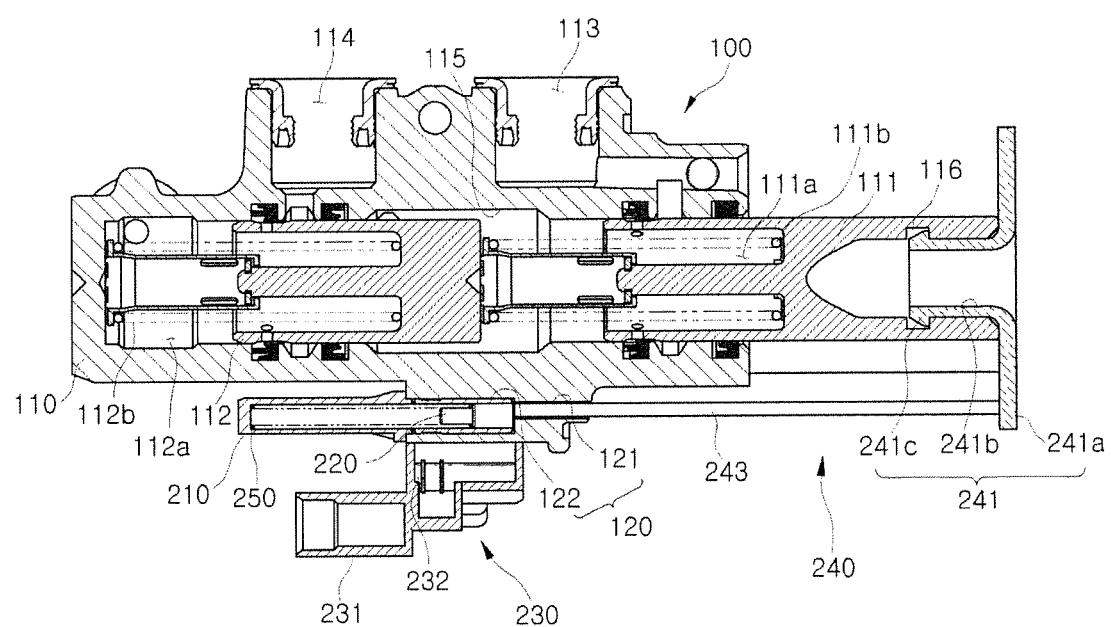

[Fig. 3]
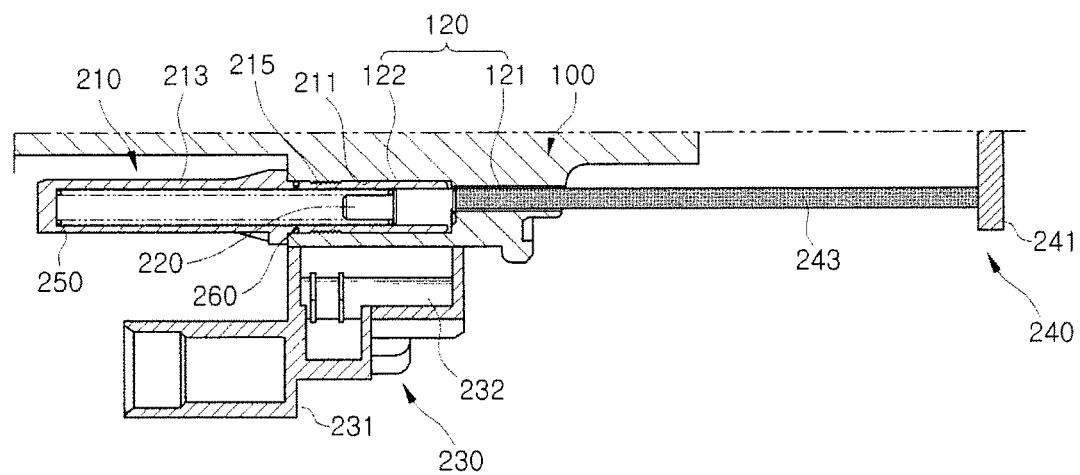
[Fig. 4]
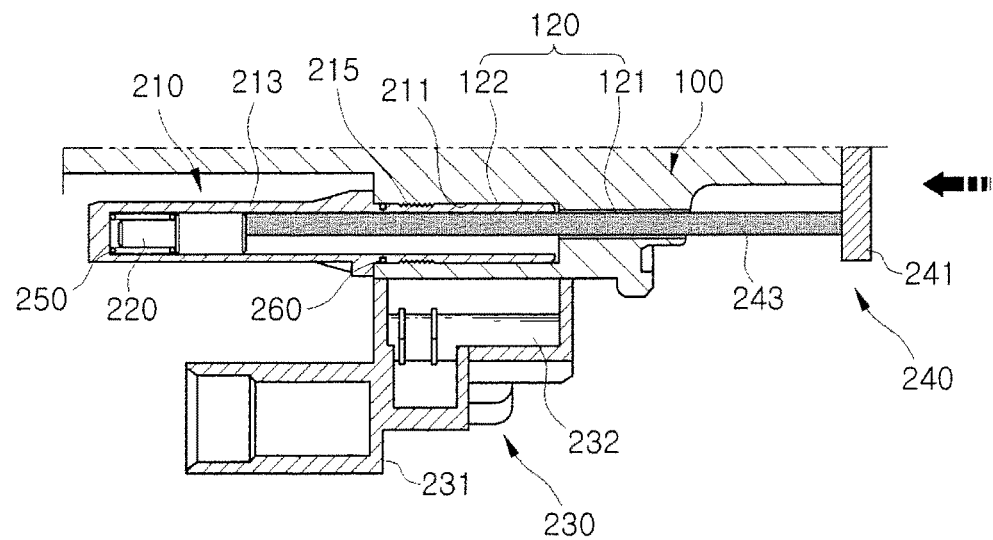

[Fig. 5]
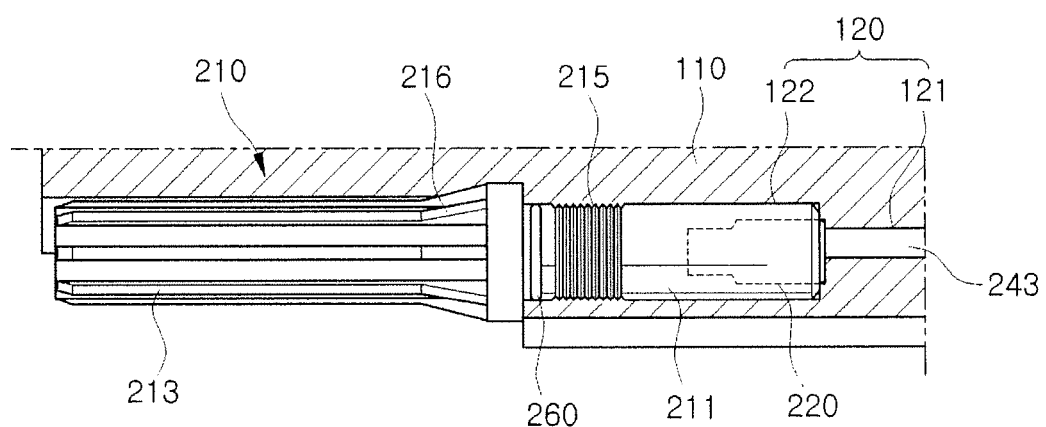
[Fig. 6]
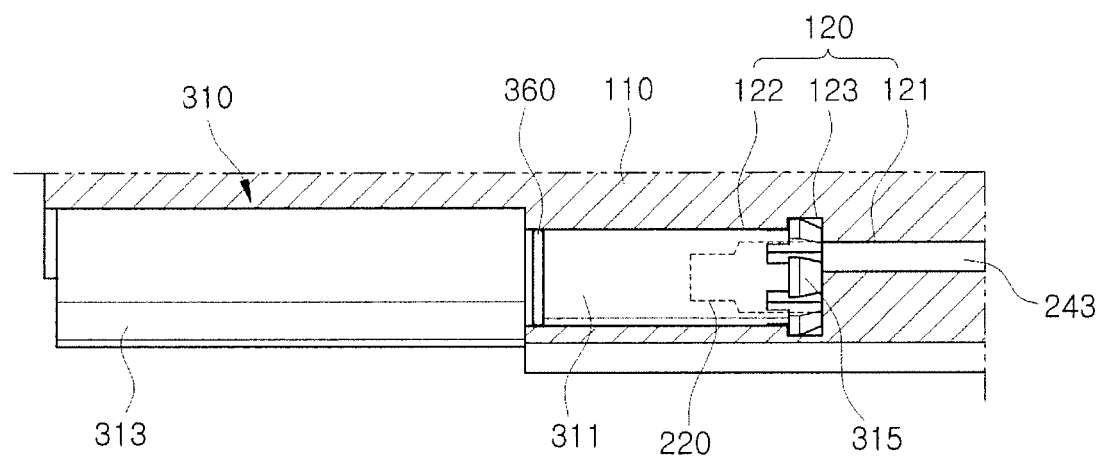

BRAKE MASTER CYLINDER

CROSS-REFERENCE TO RELATED APPLICATION

This application claims the benefit of Korean Patent Application No. 2015-0062992, filed on May 6, 2015 in the Korean Intellectual Property Office, the disclosure of which is incorporated herein by reference.

BACKGROUND

1. Field

Embodiments of the present disclosure relate to a brake master cylinder, and more particularly, to a brake master cylinder which controls lighting of a brake lamp using a hall sensor and a magnet which are installed at a master cylinder.

2. Description of the Related Art

Generally, a master cylinder of a brake in a vehicle refers to an apparatus which generates a braking force by transferring a hydraulic pressure to a wheel cylinder after a boosted force amplified by a brake booster device is converted to a hydraulic pressure using a pressure difference between vacuum and atmospheric pressure.

Such a brake master cylinder is provided with a brake light sensor (BLS) which turns on a brake lamp by sensing cylinder motion according to a pedal force. For example, a master cylinder which turns on a brake lamp using a hall sensor is disclosed in Korean Patent Registration No. 10-1085801.

RELATED ART DOCUMENT

Patent Document (Patent Document 1) Korean Patent Registration No. 10-1085801 (Nov. 16, 2011)

(Patent Document 2) A conventional brake master cylinder includes a ring-type magnet installed at a piston which slides by a pedal force, and a hall sensor installed at a cylinder body of the master cylinder, in which the piston is provided to move back and forth at a position corresponding to a position of the magnet. The hall sensor turns on a brake lamp by detecting an intensity of a magnetic force according to a movement of the magnet installed at the piston.

(Patent Document 3) Here, as a ring-type magnet installed at the piston, a rare-earth magnet such as neodymium, samarium, etc. which has a high magnetic flux density in general is used to facilitate miniaturization. However, recent soaring prices of the rare-earth elements cause a large price rise in rare-earth magnets that are made of rare-earth elements, thus development of an alternative technology is urgently needed. To substitute a general magnet for the rare-earth magnet, a large magnet volume is needed to raise magnetic flux density, however limited internal space of the master cylinder makes it difficult for the rare-earth magnet to be substituted by the general magnet.

(Patent document 4) In addition, a magnet is installed at a secondary piston rather than a primary piston in a conventional brake master cylinder. Because of this, such cases of failing to turn on the brake lamp occur when a hydraulic circuit connected to the secondary piston does not operate normally during a brake operation and the magnet becomes immobile and a signal from a hall sensor is not detected.

SUMMARY

Therefore, it is an aspect of the present disclosure to provide a master cylinder capable of further simplifying manufacturing and assembling processes without overly increasing the volume of the master cylinder.

In accordance with one aspect of the present invention, there is provided a brake master cylinder comprises a cylinder body having a hollow, a piston provided to reciprocate in the hollow, and a sensor module connected on the cylinder body and configured to sense a movement according to a reciprocating motion of the piston, wherein the sensor module includes a sensor housing coupled to a guide hole formed parallel with the hollow of the cylinder body and having a hollow therein in a length direction, a magnet installed to be slidable through the hollow of the sensor housing, and an actuating member coupled to the piston and configured to move the magnet according to a movement of the piston.

Also, further comprises an elastic member which elastically supports the magnet in the sensor housing and a sensor installed at an outer side of the cylinder body to correspond to the magnet and configured to sense a magnetic flux density of the magnet which moves according to the reciprocating motion of the piston.

Also, the guide hole includes a rod hole and a coupling hole which have different diameters from each other, and the actuating member is installed to be movable back and forth in the rod hole, the sensor housing includes a coupling portion engaged with the coupling hole inside the cylinder body, and a torso portion which extends to the outside of the cylinder body, and the coupling portion and the torso portion are penetrated by the hollow of the sensor housing to form a stroke section through which the magnet moves.

Also, the coupling portion is screw-coupled to the coupling hole.

Also, the coupling portion is elastically press-fitted to the coupling hole.

Also, the coupling portion is provided with an elastic snap fit at an end portion thereof the guide hole is provided with a head accommodating hole between the rod hole and the coupling hole to correspond to the elastic snap fit and a diameter of the elastic snap fit shrinks while advancing into the coupling hole and expands when arriving at the head accommodating hole to fix the elastic snap fit to the cylinder body.

Also, the sensor housing is coupled to the cylinder body via an O-ring.

Also, further comprises a sensor housing separately coupled to a guide hole detachably.

Also, further comprises a sensor is provided a hall sensor.

In accordance with other aspect of the present invention, there is provided brake master cylinder comprises a cylinder body having a hollow, a piston provided to reciprocate in the hollow, and a sensor module connected on the cylinder body and configured to sense a movement according to a reciprocating motion of the piston, wherein the sensor module includes a magnet which moves according to the reciprocating motion of the piston, a sensor housing coupled to a guide hole formed parallel with the hollow of the cylinder body and having a hollow therein to form a stroke section through which the magnet moves, an actuating member coupled to the piston and configured to move the magnet according to a movement of the piston, an elastic member which elastically supports the magnet in the sensor housing, and a sensor installed at an outer side of the cylinder body to correspond to the magnet and configured to sense a magnetic flux density of the magnet which moves according to the reciprocating motion of the piston.

BRIEF DESCRIPTION OF THE DRAWINGS

FIG. 1 is a perspective view illustrating a brake master cylinder according to one embodiment of the present disclosure.

FIG. 2 is a cross-sectional view of the brake master cylinder.

FIGS. 3 and 4 are enlarged cross-sectional views which illustrate operating states of a brake light sensor (BLS) of the brake master cylinder.

FIG. 5 is a view illustrating an assembly state of a BLS module of the brake master cylinder according to one embodiment of the present disclosure.

FIG. 6 is a vies illustrating an assembly state of a BLS module of to brake master cylinder according to another embodiment of the present disclosure.

DETAILED DESCRIPTION

Hereinafter, embodiments of the present disclosure will be described in detail with reference to the accompanying drawings. These embodiments below are provided to fully convey the concepts of the present disclosure to those skilled in the art. Accordingly, the present disclosure may be embodied in a different form, and is not to be construed as being limited to the embodiments set forth herein. Further, in the drawings, for the sake of clarity of the present disclosure, an illustration may have omitted portions unrelated to the explanation, and sizes, widths, and thicknesses etc. may be somewhat exaggerated for convenience of descriptions. The same reference numerals indicate the same components throughout the specification.

FIG. 1 is a perspective view illustrating a brake master cylinder according to one embodiment of the present disclosure, FIG. 2 is a cross-sectional view of the brake master cylinder, and FIGS. 3 and 4 are enlarged cross-sectional views which illustrate operating states of a brake light sensor (BLS) of the brake master cylinder.

Referring to FIG. 1, a master cylinder 100 according to the embodiment is provided with a cylinder body 110 having an internal hollow 115 (see FIG. 2), a piston 111 provided to reciprocate in the hollow 115 of the cylinder body 110, and a BLS module 200 which is installed at the cylinder body 110 and controls a lighting of a brake lamp by sensing a movement according to a reciprocating motion of the piston 111.

Specifically, as illustrated in FIGS. 1 and 2, the cylinder body 110 is formed as a cylindrical shape in which one end is open and the other end is closed. In addition, a first piston 111 and a second piston 112 which slide back and forth according to an operation of a brake pedal (not shown) by a driver are provided in series in the cylinder body 110, and oil channels 113 and 114 are provided at an upper portion of the cylinder body 110 so that a reservoir tank (not shown) is coupled for supplying oil to the master cylinder 100. Although not illustrated in the drawings, the two oil channels 113 and 114 are respectively connected to a first hydraulic circuit in which fluid is moved and circulated by the first piston 111 and a second hydraulic circuit in which fluid is moved and circulated by the second piston 112 during a braking operation.

In addition, a first hydraulic chamber 111a which is a space in which a hydraulic pressure is formed between the first piston 111 and the second piston 112, and a second hydraulic chamber 112a which is a space in which a hydraulic pressure is formed between the second piston 112 and an inner wall of one end portion of the cylinder body 110 are formed inside the cylinder body 110. A first return spring 111b and a second return spring 112b for returning the first piston 111 and the second piston 112 back to original positions thereof are respectively provided at the hydraulic chambers 111a and 112a.

In addition, a guide hole 120 which penetrates the cylinder body 110 in a length direction is formed at an outer side of the cylinder body 110. According to the illustration, the guide hole 120 is formed at a lower end side of the cylinder body 110 to be simultaneously spaced a predetermined distance from the hollow 115 and in parallel with the hollow 115. The guide hole 120 to which an actuating member 240 of the BLS module 200, which will be described below, is slidably inserted and a BLS housing 210 is fixedly coupled includes a rod hole 121 and a coupling hole 122 which have different diameters from each other.

The BLS module 200, which is installed at the coupling hole 122 of the guide hole 120, includes the BLS housing 210 which accommodates a magnet 220 therein, a hall sensor assembly 230 installed at outer side of the master cylinder 100 to face the magnet 220 while being spaced a predetermined distance therefrom for sensing a magnetic flux density, an actuating member 240 coupled to the first piston 111 to move along therewith, and an elastic member 250 which provides the actuating member 240 with an elastic restoring force.

The BLS housing 210 has a cylindrical shape and a long hollow therein in which one side is open. In addition, the BLS housing 210 includes a coupling portion 211 fixedly inserted into the coupling hole 122 inside the cylinder body, and a torso portion 213 which extends from the coupling portion and is exposed outside the cylinder body. The inside hollow of the BLS housing is provided to penetrate both the coupling portion 211 and the torso portion 213, thereby forming a stroke section through which the magnet 220 slides as a whole.

As described above, the magnet 220 is provided inside the BLS housing 210 and slides inside of the hollow of the BLS housing by the actuating member 240. The magnet 220 may be covered by a casing made of a synthetic resin material which facilitates the coupling with the actuating member 240 while not influencing the magnetic flux density.

In the embodiment, a rare-earth magnet such as neodymium, samarium, etc. having a high magnetic flux density or a general magnet which is inexpensive due to a low magnetic flux density such as a ferrite magnet or alnico magnet may be employed as the magnet, and the reason for that will be described below. A polarity of the magnet 220 may be properly disposed depending on whether the hall sensor assembly 230 to be installed senses the N pole or the S pole. In an actual industry, the hall sensor which senses the S pole is mostly used.

The hall sensor assembly 230 is fixedly installed at the outer side of the cylinder body 110. The hall sensor assembly 230 includes a sensor housing 231 in which a bracket (not shown) for coupling the assembly to the cylinder body 110 is formed, and a hall sensor 232, i.e. a magnetism detection device, installed in the sensor housing 231 to sense a change in the magnetic flux density with the magnet 220 so as to control the lighting of the brake lamp. The sensor housing 231 is easily attached to and detached from the cylinder body 110 as it is coupled by a bolt (not shown) or the like, and is fixedly installed on the cylinder body 110 after properly correcting a position thereof so that positions of the hall sensor 232 and the magnet 220 correspond to each other.

As described above, the actuating member 240 performs the role of moving the magnet 220 according to the movement of the pistons 111 and 112. More specifically, as illustrated in FIG. 2, the actuating member 240 is provided with a push plate 241 coupled to the first piston 111, and a push rod 243 having a predetermined length and coupled to the push plate 241 to be inserted into the rod hole 121 of the guide hole 120 provided at the cylinder body 110. The magnet 220 is fixedly installed at an end of the push rod 243.

The push plate 241 is engaged with a front surface of the first piston 111 which faces an output shaft (not shown) which presses the first piston 111 by a force of the brake pedal (not shown). The push plate 241 is provided with a flange portion 241*a* which is concentrically disposed with respect to the first piston 111 and protrudes in a radial direction from the first piston 111, and a fixed portion 241*b* which protrudes from the flange portion 241*a* and is fixedly inserted into the first piston 111. The fixed portion 241*b* is provided with a hooked jaw 241*c* which protrudes outward, and a concave hooked groove 116 is formed inside the first piston 111 to correspond to the hooked jaw 241*c* to couple the concave hooked groove 116 and the hooked jaw 241*c* to each other.

The push rod 243 is coupled to the flange portion 241*a* of the push plate 241 to be disposed parallel with the first piston 111 in the length direction of the cylinder body 110. The push rod 243 has a predetermined length and is inserted into the rod hole 121 of the guide hole to slide back and forth. A stroke movement length of the push rod 243 is provided as at least substantially the same as or longer than a movement length of the first piston 111 when the brake operates.

The elastic member 250 is provided at the opposite side of the push rod 243 based on the magnet 220 in the BLS housing 210 and elastically supports the magnet 220. That is, one end of the elastic member 250 is supported by a closed inner wall of the BLS housing, and the other end is supported by the magnet 220. As the above described elastic member 250, a coil spring may be employed.

As described above, the embodiment may minimize the size of the rare-earth magnet or maintain a high degree of accuracy even when an inexpensive general magnet such as a ferrite magnet, an alnico magnet, or the like is employed by providing the guide hole 120 at the outer side of the cylinder body 110, installing the BLS housing 210 in which the magnet 220 is accommodated in the guide hole 120 to be slideable, and installing the hall sensor 232 at a position close to the cylinder body 110 corresponding to the magnet 220. The reason for that is that the master cylinder 100 needs to have a considerably thick thickness to withstand a hydraulic pressure generated therein, but the thickness between the magnet 220 and the hall sensor 232 provided at the outer side of the cylinder body may be used when the thickness may only withstand a vacuum pressure inside a booster, thereby reducing the size of the rare-earth magnet or making possible the use of a general magnet having a low magnetic flux density by minimizing the space between the hall sensor and the magnet.

FIGS. 3 and 4 are views illustrating operating states of the BLS module 200 provided at the brake master cylinder according to the embodiment. FIG. 3 is an enlarged view of the BLS module before and after a braking operation, and FIG. 4 is an enlarged view illustrating the BLS module during the braking operation.

As illustrated in the drawings, the BLS housing 210 may be installed on the cylinder body 110 via an O-ring 260 to withstand the vacuum pressure, and may be provided with a thread 215 at an outer surface of the coupling portion 211 to be screw-coupled to an inner wall of the coupling hole 122 of the guide hole 120 to facilitate assembling with the cylinder body 110. In addition, as illustrated in FIG. 5, the BLS housing 210 is provided with a step between the coupling portion 211 and the torso portion 213 to be pressed against the cylinder body 110 so that the stroke of the magnet 220 sliding therein maintains linearity, and a bead 216 is provided on a surface of the torso portion 213 in a length direction to prevent deformation.

FIG. 6 illustrates a BLS housing 310 according to another embodiment of the present disclosure. The BLS housing 310 according to another embodiment, which includes a stepped coupling portion 311 and a torso portion 313 and is fixedly installed at a coupling hole 122 of a guide hole 120 of a cylinder body 110 via an O-ring, is the same as the one embodiment but there is a difference in an engaging method. For instance, the BLS housing 310 is provided with an elastic snap fit 315 at an end portion of the coupling portion 311 and a head accommodating hole 123 is provided between a rod hole 121 and the coupling hole 122 in order to correspond to the elastic snap fit 315, and thereby the BLS housing 310 may be elastically press-fitted and assembled to the cylinder body 110. That is, the elastic snap fit 315, as illustrated, is provided with a plurality of fork type protrusions so that a diameter thereof shrinks while advancing to the coupling hole 122 and the diameter expands when arriving at the head accommodating hole 123, and thereby the elastic snap fit 315 may be solidly fixed to the cylinder body 110.

Now, an operating state of the BLS module according to an operation of the brake master cylinder having the above described structure will be described with reference to the drawings.

First, referring to FIG. 2, the first piston 111 of the master cylinder 100 moves forward by the brake boosting device or by a required quantity of force from a pedal detecting sensor when the driver steps on the brake pedal (not shown) for a braking operation. Fluid inside the first hydraulic chamber 111*a*, which is sealed, is compressed when the first piston 111 moves forward, in line with which fluid inside the second hydraulic chamber 112*a* is compressed as the second piston 112 also moves forward. The first return spring 111*b* and the second return spring 112*b* respectively provided in front of the first piston 111 and the second piston 112 are compressed when a force is applied to the brake pedal, and the first piston 111 and the second piston 112 are returned back to original positions thereof by an elastic restoring force when the force applied to the brake pedal is released.

When the first piston 111 and the second piston 112 move back and forth, the hall sensor assembly 230 installed at the outer side the cylinder body 110 senses the movement of the first piston 111. That is, as illustrated in FIG. 4, when the first piston 111 moves forward, the push plate 241 and the push rod 243 which are coupled to the first piston 111 move, which moves the magnet 220 in the BLS housing 210. At this point, the magnet 220 moves while compressing the elastic member 250, and a change in a magnetic flux density occurs between the magnet 220 which moves in the BLS housing 210 and the hall sensor 232. The magnetic flux diminishes when the magnet 220 moves away from the hall sensor 232 which senses the magnetic flux, and the hall sensor assembly 230 senses the diminished magnetic flux and turns on the brake lamp.

Conversely, when the first piston 111 returns back to the original position upon release of the braking operation, the magnet 220 of the BLS module 200 also quickly returns back to the original position by the elastic member 250 which increases the magnetic flux acting on the hall sensor 232, and thereby the hall sensor assembly 230 turns off the brake lamp.

As is apparent from the above description, the brake master cylinder according to one embodiment of the present disclosure generates continuous signal output from the BLS without an error by installing the magnet on the primary piston, and as the BLS module is separately installed on the master cylinder body and is provided with the BLS housing which accommodates the magnet to be slidable therein and the hall sensor is provided at a position corresponding to and close to the magnet, the overall volume of the master cylinder can be reduced and the assembly process can be simplified.

In addition, the brake master cylinder according to one embodiments of the present disclosure can save manufacturing costs since the BLS module is provided to be installed at the outer side of the cylinder body instead of inside the cylinder body. For example, while the master cylinder needs to have a certain thickness sufficient to withstand the hydraulic pressure generated therein, the thickness between the BLS housing and the hall sensor which are provided at the outer side of the master cylinder can be used when the thickness can only withstand the vacuum pressure therein, thereby reducing the size of the rare-earth magnet or maintaining a high degree of accuracy even when a general magnet having a low magnetic flux density is employed by minimizing the space between the hall sensor and the magnet.

Although a few embodiments of the present disclosure have been shown and described, it should be appreciated by those skilled in the art that changes may be made in these embodiments without departing from the principles and spirit of the invention, the scope of which is defined in the claims and their equivalents.

What is claimed is:

1. A brake master cylinder comprising:
   a cylinder body having a hollow and a guide hole formed parallel with the hollow of the cylinder body;
   a piston provided to reciprocate in the hollow; and
   a sensor assembly configured to sense a movement according to a reciprocating motion of the piston,
   wherein the sensor assembly includes:
      a brake light sensor (BLS) housing having a hollow in a length direction through which a magnet is slidable, the BLS housing being separate from the cylinder body and coupled to the guide hole disposed in the cylinder body; and
      an actuating member coupled to the piston and configured to move the magnet according to a movement of the piston.

2. The brake master cylinder of claim 1, further comprising:
   an elastic member which elastically supports the magnet in the BLS housing; and
   a sensor installed in a sensor housing and configured to sense a magnetic flux density of the magnet which moves according to the reciprocating motion of the piston,
   wherein the sensor housing is coupled to a side portion of the cylinder body such that the sensor is located at an outer side of the cylinder body adjacent to the magnet.

3. The brake master cylinder of claim 2, wherein:
   the guide hole includes a rod hole and a coupling hole which have different diameters from each other, and the actuating member is installed to be movable back and forth in the rod hole;
   the BLS housing includes a coupling portion engaged with the coupling hole inside the cylinder body, and a torso portion which extends to the outside of the cylinder body; and
   the coupling portion and the torso portion are penetrated by the hollow of the BLS housing to form a stroke section through which the magnet moves.

4. The brake master cylinder of claim 3, wherein the coupling portion is screw-coupled to the coupling hole.

5. The brake master cylinder of claim 3, wherein the coupling portion is elastically press-fitted to the coupling hole.

6. The brake master cylinder of claim 5, wherein:
   the coupling portion is provided with an elastic snap fit at an end portion thereof;
   the guide hole is provided with a head accommodating hole between the rod hole and the coupling hole to correspond to the elastic snap fit; and
   a diameter of the elastic snap fit shrinks while advancing into the coupling hole and expands when arriving at the head accommodating hole to fix the elastic snap fit to the cylinder body.

7. The brake master cylinder of claim 4, wherein the BLS housing is coupled to the cylinder body via an O-ring.

8. The brake master cylinder of claim 1,
   wherein the BLS housing is separately coupled to the guide hole detachably.

9. The brake master cylinder of claim 2, wherein the sensor is provided as a hall sensor.

10. A brake master cylinder comprising:
    a cylinder body having a hollow and a guide hole formed parallel with the hollow of the cylinder body;
    a piston provided to reciprocate in the hollow; and
    a sensor assembly configured to sense a movement according to a reciprocating motion of the piston,
    wherein the sensor assembly includes:
       a magnet;
       a brake light sensor (BLS) housing having a hollow therein to form a stroke section through which the magnet moves, the BLS housing being separate from the cylinder body and coupled to the guide hole disposed in the cylinder body;
       an actuating member coupled to the piston and configured to move the magnet according to a movement of the piston;
       an elastic member which elastically supports the magnet in the BLS housing; and
       a sensor installed in a sensor housing and configured to sense a magnetic flux density of the magnet which moves according to the reciprocating motion of the piston.

11. The brake master cylinder of claim 10, wherein the sensor housing is coupled to a side portion of the cylinder body such that the sensor is located at an outer side of the cylinder body adjacent to the magnet.

* * * * *